(12) United States Patent
Nakamura et al.

(10) Patent No.: US 6,178,149 B1
(45) Date of Patent: Jan. 23, 2001

(54) STORAGE MEDIUM LOADING MECHANISM AND STORAGE MEDIUM STORAGE AND/OR REPRODUCING APPARATUS

(75) Inventors: Tadami Nakamura, Saitama; Kazuhito Kurita, Kanagawa, both of (JP)

(73) Assignee: Sony Corporation, Tokyo (JP)

( * ) Notice: Under 35 U.S.C. 154(b), the term of this patent shall be extended for 0 days.

(21) Appl. No.: 09/009,623

(22) Filed: Jan. 20, 1998

(30) Foreign Application Priority Data

Jan. 24, 1997 (JP) .................................................. 9-011393

(51) Int. Cl.⁷ ............................. G11B 33/02; G11B 17/04
(52) U.S. Cl. ........................................ 369/77.2; 360/99.06
(58) Field of Search ................................ 369/77.2, 75.2, 369/77.1; 360/99.06, 99.07

(56) References Cited

U.S. PATENT DOCUMENTS

| | | | |
|---|---|---|---|
| 5,355,357 | * 10/1994 | Yamamori et al. | 369/75.2 |
| 5,450,377 | * 9/1995 | Eom | 369/13 |
| 5,452,280 | * 9/1995 | Yamamori et al. | 369/77.2 |
| 5,504,730 | * 4/1996 | Kanada | 369/75.1 |
| 5,642,344 | * 6/1997 | Yamada et al. | 369/77.2 |
| 5,659,530 | 8/1997 | Kurita | 369/77.2 |

FOREIGN PATENT DOCUMENTS

| | | | |
|---|---|---|---|
| 0547944 A2 | 6/1993 | (EP) | G11B/17/04 |
| 0640970 A2 | 3/1995 | (EP) | G11B/25/04 |

* cited by examiner

Primary Examiner—Brian E. Miller
Assistant Examiner—Kenneth W. Fields
(74) Attorney, Agent, or Firm—Limbach & Limbach L.L.P.

(57) ABSTRACT

The present invention relates to a rotary disk loading mechanism. A disk loading mechanism according to the present invention includes a recording medium holder which is rotatably supported by a chassis and into which a storage medium such as a mini disk (trademark) or the like is inserted, an eject lever as a rotation operation member disposed on one side of the recording medium holder and movably supported by the chassis, an operation converting means formed of a cam and so on for converting movement of the eject lever into rotation of the recording medium holder, a holder locking member rotatably provided on the chassis and biased by a first springy member, and an engagement portion provided on the eject lever and biased by a second springy member in a predetermined direction to thereby be engaged with the holder locking member. When the holder locking member is brought in contact with the storage medium to be inserted into the recording medium holder and thereby rotated against a spring force of the first springy member, a relief surface provided on one of the holder locking member and the engagement portion is brought in contact with the other thereof and release of engagement of the holder locking member and the engagement portion is started early as compared with release of the engagement prevented when no relief surface is provided. Thus, it is possible to provide a loading mechanism which improves operability upon insertion of the storage medium.

28 Claims, 15 Drawing Sheets

STORAGE MEDIUM LOADING MECHANISM AND STORAGE MEDIUM STORAGE AND/OR REPRODUCING APPARATUS

BACKGROUND

1. Field of the Invention

The present invention relates to a storage medium storage and/or reproducing apparatus for recording and/or reproducing information with using a storage medium.

2. Background of the Invention

In the past, an electronic equipment employing an optical disk as a memory medium, what is shown in FIG. 1 has been generally known. The electronic equipment shown in FIG. 1, is a disk reproducing apparatus for inserting a disk cartridge housing therein an optical disk used for recording and/or reproduction of information into a holder in the equipment. The disk reproducing apparatus has a casing 1 having a storage medium insertion portion provided through its front surface and a front panel 2 attached to the storage medium insertion portion of the casing 1. The storage medium insertion portion of the casing 1 is closed by the front panel 2.

The front panel 2 has a storage medium insertion portion 3 having a long rectangular opening portion extended laterally and formed therethrough, and through the storage medium insertion portion 3, a optical disk 4 as a storage disk is inserted and ejected. The storage medium insertion portion 3 provided in the front panel 2 can be opened and closed by a lid body 5 provided on its inner side. At an inside of the lid body 5 is provided a storage medium holder for holding the optical disk 4 and for loading the optical disk 4 onto a turntable of a disk rotation mechanism.

The holder of the disk reproducing apparatus is generally held horizontally relative to a chassis through a slide member. The holder is arranged to be movable in an upward and downward direction relative to the chassis by a set of vertical and parallel movement mechanisms provided on both the left and the right sides of the holder while being kept in its horizontal posture.

The above disk reproducing apparatus employs an arrangement in which the vertical and parallel movement mechanisms are provided on both left and right sides of the holder, and the holder is supported from both sides by the similar parallel movement mechanisms to move the holder with being kept in its horizontal posture. Since the parallel movement mechanisms are respectively provided on both sides of the holder, this increases a width dimension in a left and right direction, and a need for a mechanism that interlockingly activates both of the parallel movement mechanisms comparatively complicates the arrangement of the disk reproducing apparatus.

A lock release position of the holder lock member for locking the holder is nearly at the same position where the storage medium is loaded onto the turntable of the disk rotating mechanism. As a result, when the storage medium is inserted into the disk reproducing apparatus, the storage medium must be deeply pushed into an innermost part of the storage medium holder, which gives a user unsatisfactory operability when the storage medium is inserted.

SUMMARY OF THE INVENTION

In order to solve the above problems, it is an object of the present invention to simplify a movement mechanism by using a rotary storage medium holder and to improve operability obtained when a storage medium is inserted.

According to the present invention, in order to achieve the above object, a storage medium loading mechanism includes a holder which is rotatably supported by a chassis and into which a storage medium is inserted, an operation member disposed on one side of the holder and movably supported by the chassis, a holder locking member rotatably provided on the chassis and biased by a first springy member, and an engagement portion provided on the operation member and biased by a second springy member in a predetermined direction to thereby be engaged with the holder locking member. When the holder locking member is brought in contact with the storage medium to be inserted into the holder and thereby rotated against a spring force of the first springy member, a relief surface provided on one of the holder locking member and the engagement portion is brought in contact with the other thereof and release of engagement of the holder locking member and the engagement portion is started.

According to the present invention, in order to achieve the above object, a storage medium storage and/or reproducing apparatus includes a holder which is rotatably supported by a chassis and into which a storage medium is inserted, an operation member disposed on one side of the holder and movably supported by the chassis, a holder locking member rotatably provided on the chassis and biased by a first springy member, a storage and/or reproducing means for storing and/or reproducing the storage medium held by the holder, and an engagement portion provided on the operation member and biased by a second springy member in a predetermined direction to thereby be engaged with the holder locking member. When the holder locking member is brought in contact with the storage medium to be inserted into the holder and thereby rotated against a spring force of the first springy member, a relief surface provided on one of the holder locking member and the engagement portion is brought in contact with the other thereof and release of engagement of the holder locking member and the engagement portion is started.

BRIEF DESCRIPTION OF THE DRAWINGS

FIGS. 8A to 8C are diagrams used to explain an operation relationship among the disk cartridge, an eject lever and a holder locking member in the disk loading mechanism shown in FIG. 4, wherein FIG. 8A shows a state that the disk cartridge is in contact with the holder locking member, FIG. 8B shows a state that the disk cartridge is moved to a predetermined position and then the holder locking member is rotated, and FIG. 8C shows a state that the eject lever is moved forward;

FIGS. 11A to 11C are diagrams used to explain an operation relationship among the disk cartridge, an eject lever and a holder locking member when the holder locking member shown in FIG. 8 has a relief surface, wherein FIG. 11A shows a state that the disk cartridge is in contact with the holder locking member, FIG. 11B shows a state that the disk cartridge is moved to a predetermined position and then the holder locking member is rotated, and FIG. 11C shows a state that the eject lever is moved forward;

DESCRIPTION OF THE PREFERRED EMBODIMENTS

An arrangement of an electronic equipment according to the present invention will hereinafter be described in detail with reference to the accompanying drawings.

Figure 1:
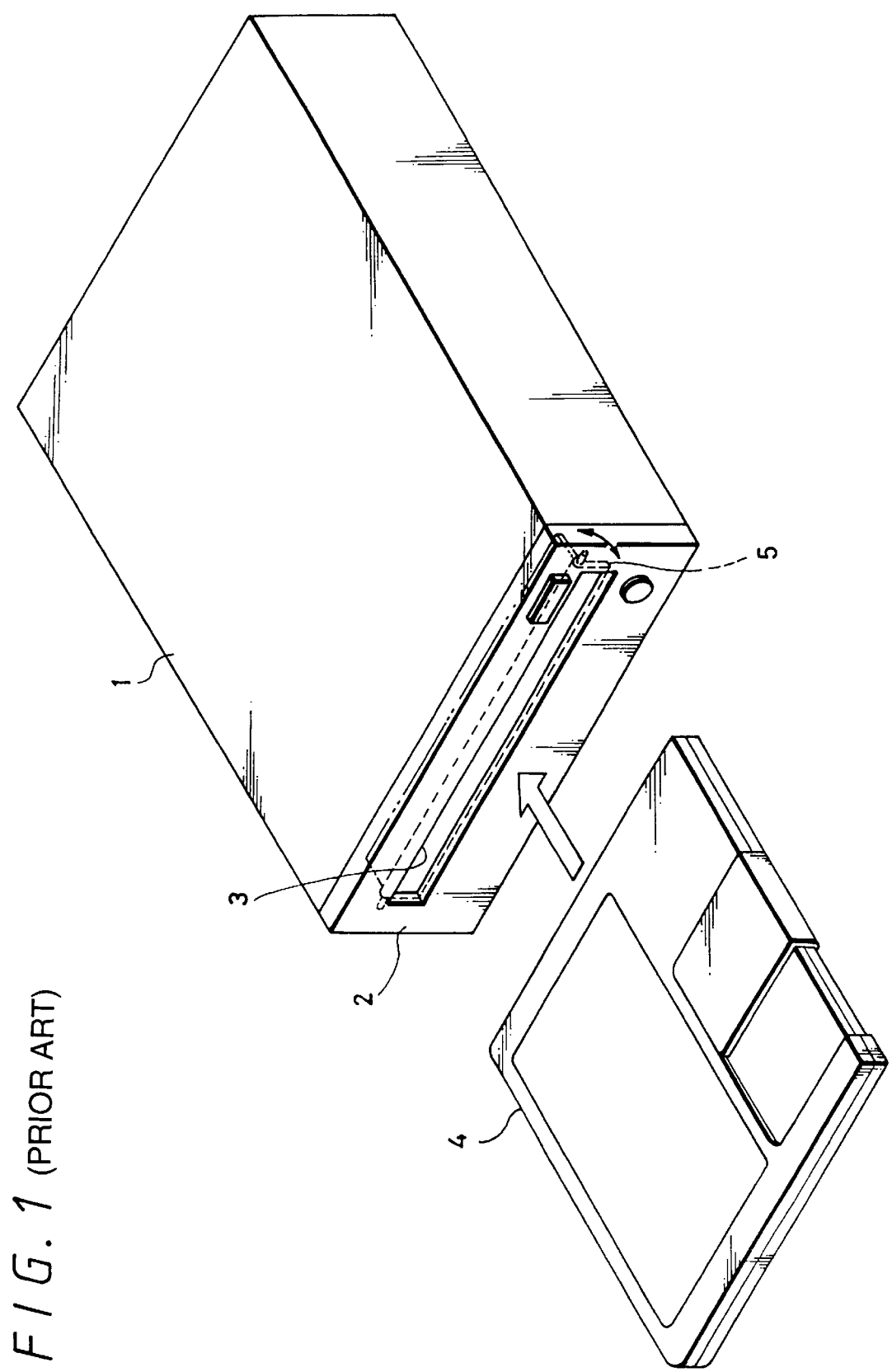
FIG. 1 is a diagram showing an appearance of a disk reproducing apparatus.
Figure 2:
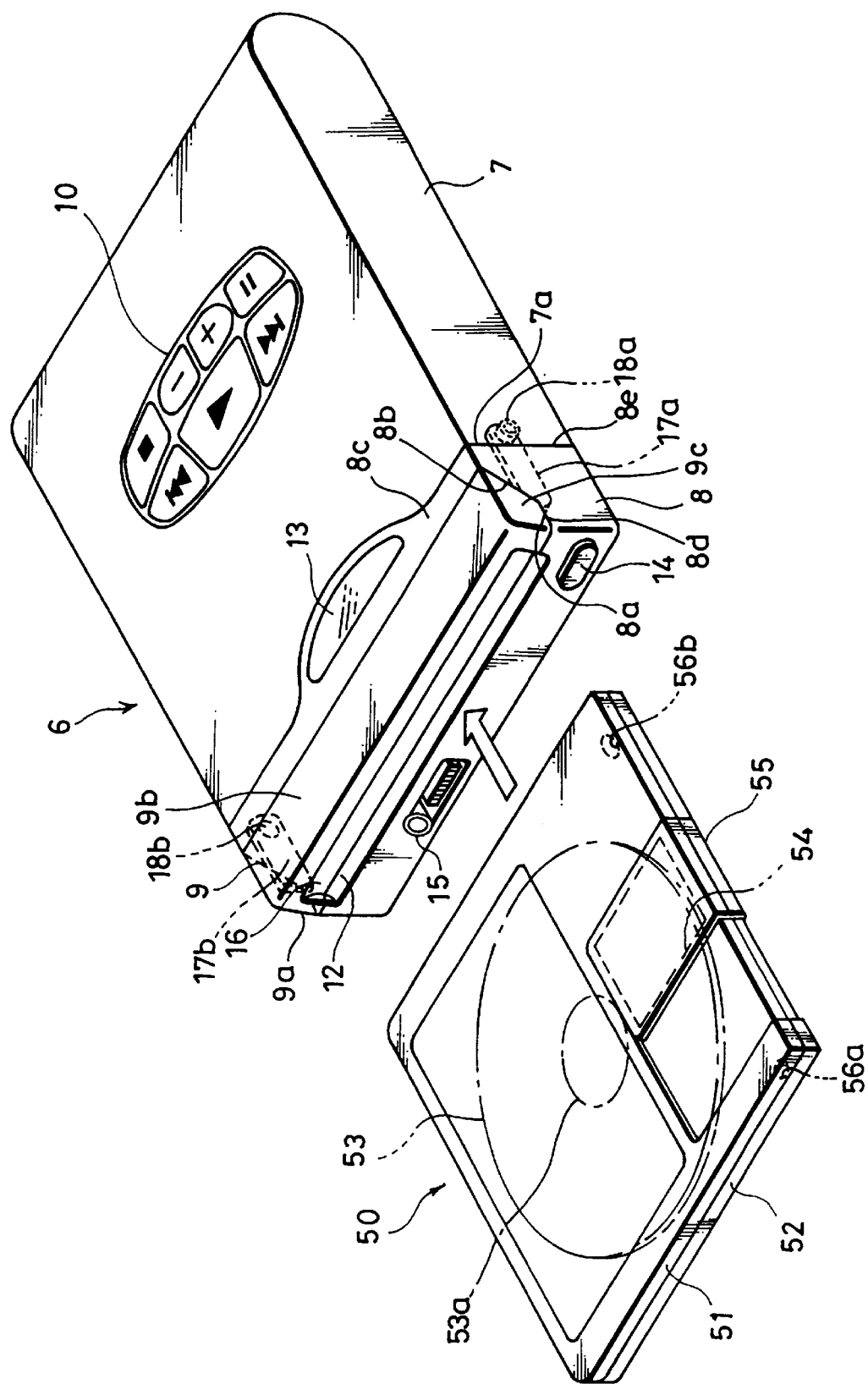
FIG. 2 is a perspective view showing an appearance of a disk reproducing apparatus according to an embodiment of the present invention and that of a disk cartridge used therein.

FIG. 2 is perspective view of a reproduction-only disk reproducing apparatus as an electronic equipment to which the present invention is applied. A disk reproducing apparatus 6, as shown in FIG. 2, is provided with an armor body having a casing 7, a front panel 8 and a lid body 9, and the armor body accommodates therein a disk loading mechanism, a disk rotation mechanism, an information reproduction mechanism, a shutter opening mechanism, and the like.

The casing 7 constituting a part of the armor body has an opening portion 7a formed through its front surface, and therein is accommodated and fixed a chassis. On the chassis, the disk loading mechanism, the information reproduction mechanism and the like are mounted. On an upper surface of the casing 7, an operating device 10 having a reproduction button, a fast-forward button, a stop button, a sound volume adjusting button and the like is provided. A front panel 8 is fitted to the opening portion provided through the front surface of the casing 7, and the front panel 8 is fastened and integrally fixed on the casing 7 by a fixing means such as a fitting screw and the like.

Figure 3:
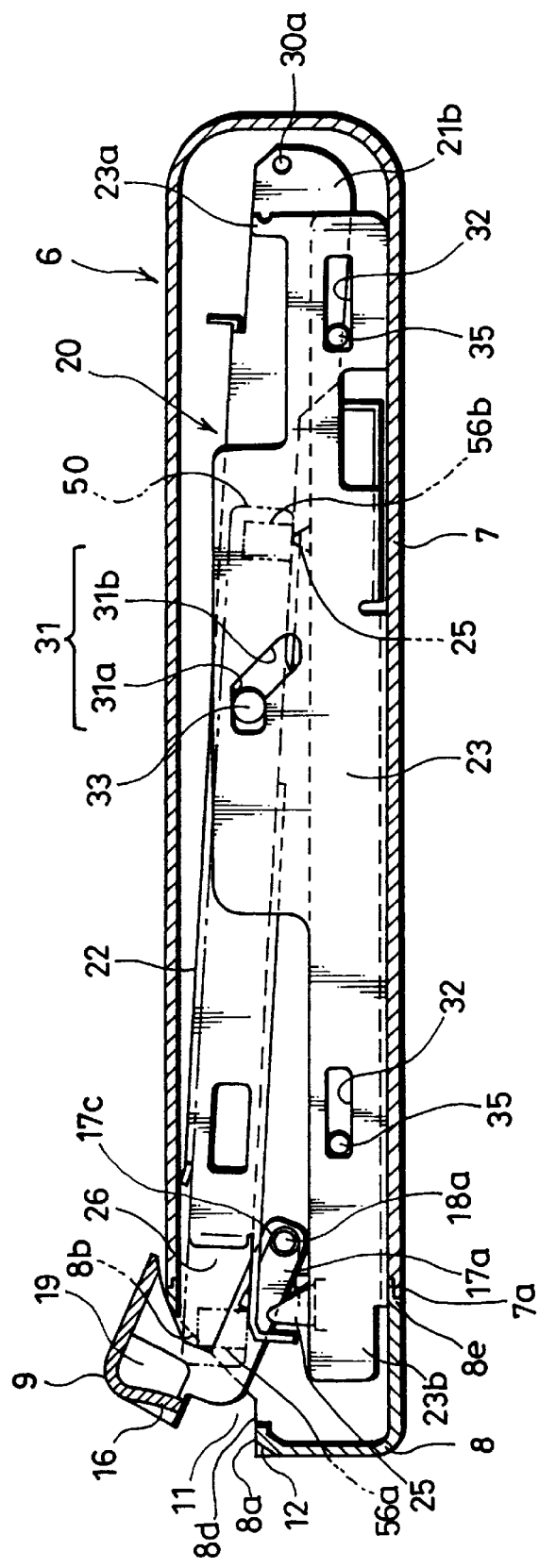
FIG. 3 is a diagram used to explain a rotation operation of a rotary disk loading mechanism incorporated in the disk reproducing apparatus in a state that an inclined angle of the cartridge holder is set maximum.

As shown in FIG. 3, the front panel 8 fitted in and fixed to the casing 7 has opening portions 8d, 8e respectively formed through upper and rear surfaces thereof, and the opening portion 8e on the rear surface side is opposed to the opening portion 7a of the casing 7. On the upper portion of the front panel 8 are provided a plane receiving portion 8a with which a lower end edge of the lid body 9 comes in contact, and a slant receiving portion 8b which consecutively rises up backward continuously from the rear side of the plane receiving portion 8a. The slant receiving portion 8b is extended straight from its lower end portion to the vicinity of its upper end portion and is formed to convexly curve at the upper portion of the slant receiving portion 8b.

At a front end edge of the plane receiving portion 8a of the front panel 8, there is provided a guide slanting portion 12 of the panel side which descends forward. Lateral length of the guide slanting portion 12 is set to be substantially as long as that of the storage medium insertion portion 11. When a disk cartridge 50 is inserted, the disk cartridge 50 is brought at a lower end edge of its front end surface in contact with the guide slanting portion 12, thereby the guide slanting portion 12 serving to guide the given disk cartridge 50 in the direction in which the disk cartridge 50 is inserted.

At the back side of the slanting receiving portion 8b is provided a back frame potion 8c for connecting the left and right slant receiving portions 8b. At a middle portion in a length wise direction of the back frame portion 8c is provided a transparent window 13 through which the inserted disk cartridge 50 can be seen. On a front surface of the front panel 8 are provided an eject button 14 used for automatically ejecting the inserted disk cartridge 50 and a head phone jack 15 for connecting a head phone thereto.

The lid body 9 covering the opening portions 8d and the opening portion 8e of the front panel 8 has a front face board 9a, an upper face board 9b which is consecutively extended backward from an upper end portion of the front face board 9a and a side face board 9c being consecutively formed on both sides of the front face board 9a and the upper face board 9b. On the front face board 9a of the lid body 9 is provided a guide slanting portion 16 which has a slanting curved face that descends backwards at a position opposed to the guide slanting portion 12. The guide slanting portion 16 is formed so that the lengths in the forward and backward direction and the left and right direction thereof should be set to be substantially the same as those of the guide slanting portion 12 on the front panel 8. Upon the insertion of the disk cartridge 50, an insertion-side upper end edge of the front end surface of the disk cartridge 50 is brought in contact with the guide slanting portion 16 with the storage medium insertion portion 11 resultantly being opened because the lid body 9 is pushed upward by a pushing force of the disk cartridge 50.

The guide slanting portion 16 of the lid body 9 and the guide slanting portion 12 of the front panel 8 are consecutively formed in a V letter shape in section near a boundary at which they come in contact with one another, and at a time of the insertion of the disk cartridge 50, an operation for opening the lid 9 is automatically carried out by cooperation of the guide slanting portions 12 and 16.

At portions on both sides of a lower face of the upper face board 9b of the lid body 9, are provided arm portions 17a, 17b protruding downward. These arm portions 17a, 17b are provided on inner sides of the front panel 8 so as to avoid the slant receiving portion 8b of the front panel 8 and at the same time, the arm portions 17a, 17b are respectively formed with middle portions folded and bent backward. At a tip end portion of one arm portion 17a is provided a cylindrical shaft portion 18a of a cylinder shape, and at a tip end portion of another arm portion 17b is formed a bearing hole 18b.

A rotating shaft provided on one side of the panel 8 is rotatably fitted in with a hole of the cylindrical shaft portion 18a and a rotating shaft provided on the other side of the front panel 8 is rotatably fitted in the bearing hole 18b. These rotating shafts serve as rotating centers of the lid body 9. By rotating the lid body 9 with those rotating shafts as a rotation center, the lid body 9 can be moved outward in the release direction relative to the casing 7.

A rib 19 is provided between both the arms 17a and 17b for lifting the lid body 9. At times of the disk cartridge 50 being inserted and ejected, a portion of the lid body 9 coming in contact with the disk cartridge 50 is only a tip end portion of the rib 19. The rib 19 rides onto an upper face of the disk cartridge 50 for reducing slide frictional resistance of the lid body 9 when the disk cartridge 50 is inserted and ejected, thereby making it possible for a rotation of the lid body 9 to be easily carried out.

Between the lid body 9 and the front panel 8, there is provided a torsion spring 17c as a springy means for always biasing the lid body 9 toward the front surface of the front panel 8. A coiled portion at a center of the torsion spring is loosely fitted in the cylindrical shaft portion 18a and at the same time, an elastic tab protruded from one end of the coiled portion is engagingly stopped by a spring receiving tab of the arm portion 17a and an elastic tab protruded from the other end is engagingly stopped by a spring receiving tab provided on an inner face of the front panel 8. The lid body 9 is urged toward the front surface of the front panel 8 by the spring force of the torsion spring 17c, thereby closing the storage medium insertion portion 11.

The disk cartridge 50 used for the disk reproducing apparatus 6 has an arrangement, for example, shown in FIG. 2. The disk cartridge 50 comprises a set of an upper shell 51 and a lower shell 52, a disk-like storage medium 53 such as a magnetic optical disk and the like rotatably accommodated in a disk accommodation portion provided between both the upper shell 51 and lower shell 52 and so on. At a central portion of the disk-like storage medium 53 is attached a metal hub 53a absorbed by the magnet of the turntable housed in the casing 7. The turntable is inserted through a hub aperture provided at a center portion of a lower shell 52 and absorbed on a lower surface of the metal hub 53a, thereby the disk-like storage medium 53 being chucked.

In the disk cartridge 50 is provided an opening portion 50 through which a reproduction head of the information reproduction mechanism is put in and out and at the same time, the opening portion 54 is capable of being opened and closed by a shutter 55. The shutter 55 of the disk cartridge 50 is opened by a shutter opening mechanism similarly provided in the cartridge holder 22. The reproduction head is inserted into the opened opening portion 54. At both side portions of the lower shell 52 which is on a side to be attached with the shutter 55 are provided a set of positioning holes 56a and 56b for positioning. The positioning hole 56a is made as a round hole, and the other positioning hole 56b is an oblong hole extending in the direction in which the disk cartridge 50 is inserted. By both the positioning holes 56a and 56b, the disk cartridge 50 is positioned.

Within the armor body having such an arrangement are accommodated a rotary type disk loading mechanism 20 a disk rotation mechanism 40, an information reproduction mechanism, a shutter opening mechanism and the like.

Figure 4:
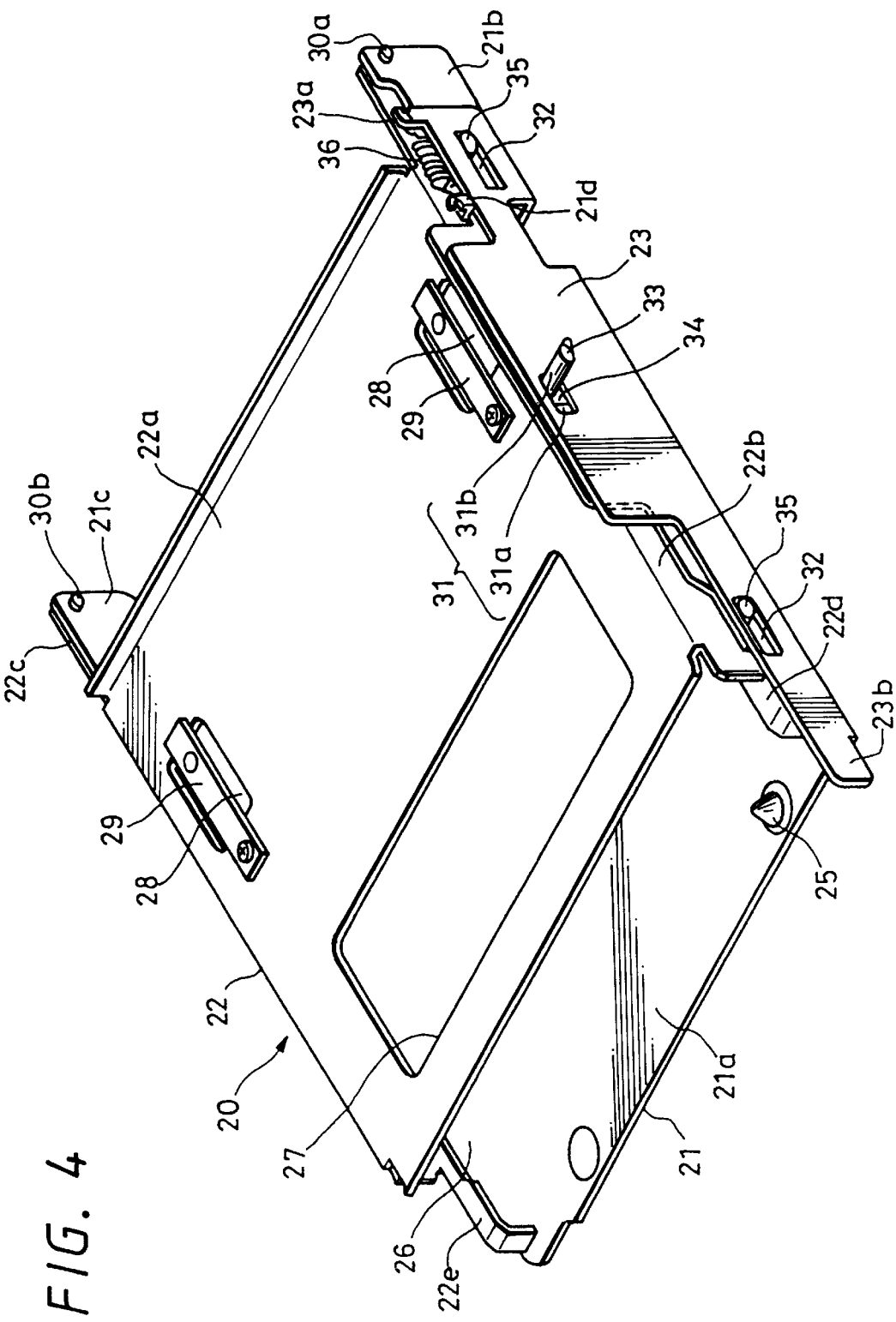
FIG. 4 is a perspective view showing an appearance of the rotary disk loading mechanism of the disk reproducing apparatus according to present invention.

As shown in FIG. 4, the disk loading mechanism 20 is provided with a chassis 21 attached and fixed to the casing 7, the cartridge holder 22 rotatably supported by the chassis 21, an eject lever 23 as a rotation operating member supported to be capable of moving in a front to rear direction relative to the chassis 21, and the like.

The chassis 21 has a lower face plate 21a which is a bit larger than the disk cartridge 50 and square in shape, a right side face plate 21b formed in a way that a whole right side face portion of the bottom plate 21a stands upright and a left side plate 21c formed in a way that a rear face portion on the left side area of the bottom plate 21a stands upright. On a front side of the chassis 21 are disposed the front panel 8 and the lid body 9. At front and rear portions on one side of the chassis 21 are provided a set of circular cone shaped guide pins 25, 25 for positioning the disk cartridge 50 inserted into the cartridge holder 22 and for guiding the disk cartridge 50 in the direction of insertion thereof.

The cartridge holder 22 has an upper face plate 22a square in shape, which is almost the same in width dimension as the chassis 21 but shorter in a front to rear direction than the chassis 21 and covers the upper face of the chassis, left and right side face plates 22b and 22c formed in a way that they are bent downward on both left and right sides of the upper face plate 22a, and support plates 22d and 22e formed on lower portions on front sides of both the side plates 22b and 22c, being consecutively bent inside with a proper width. A disk cartridge loading portion is formed by a space part surrounded by the upper face plate 22a, the side face plates 22b and 22c and the support plates 22d and 22e. The disk cartridge 50 is inserted and ejected through the cartridge inserting mouth 26 on a front side of the disk cartridge loading portion and loaded on and supported by the disk cartridge loading unit.

In the front middle portion of the cartridge holder 22 is opened an opening window 27 for permitting a user to see the inside. At both side portions on rear sides are provided opening portions 28, 28 for springs. Plate springs 29, 29 are respectively attached to on the opening portions 28, 28. The push plate springs 29, 29 urge the disk cartridge 50 inserted into the cartridge holder 22 toward the supporting plates 22d and 22e sides and absorb fluctuation in the upward and downward direction of the disk cartridge 50.

The chassis 21 and the cartridge holder 22 are rotatably linked with each other at their rear end portions by rotating shafts 30a and 30b. At the inside of the one side face plate 21b of the chassis 21 is provided the one side plate 22b of the cartridge holder 22 and at the outside of the other side face plate 21c of the chassis 21 is provided the other side face plate 22c of the cartridge holder 22. The rotating shafts 30a and 30b are penetrated respectively through the side face plates 21b, 22b and the 21c, 22c by making the respective axial lines match on the same line. The chassis 21 and the cartridge holder 22 are made to be capable of rotating relative to each other with the rotation shafts 30a and 30b as a center of rotation.

On the outside of the one side face plate 21 of the chassis 21 is provided the eject lever 23 in parallel with the side face plate 21b, which serves as a rotation operation member for giving the cartridge holder 22 a constant rotation motion. On one side of the chassis 21 is provided an action converting means for, in cooperation with these chassis 21, cartridge holder 22 and ejector lever 23, converting a linear action of the eject lever 23 into a rotating action of the cartridge holder 22.

Figure 5:
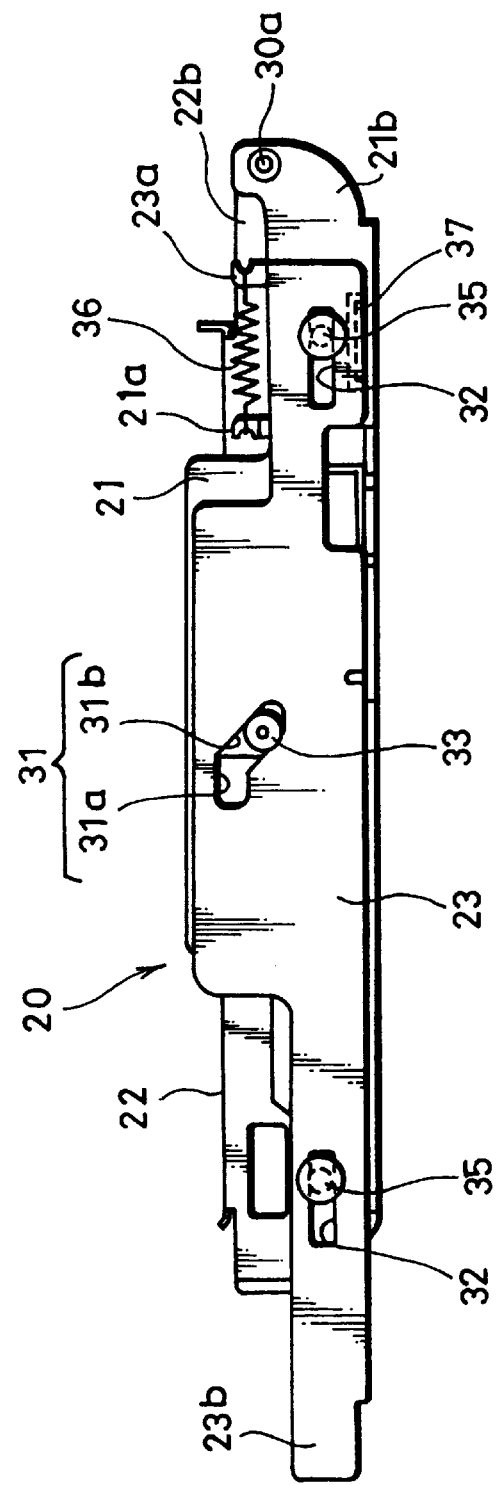
FIG. 5 is a side view of the disk loading mechanism shown in FIG. 4.

The eject lever 23 is formed of, as shown in FIG. 5, a plate body having a cam hole 31 provided nearly at a central portion in a longitudinal direction and guide holes 32, 32 provided at a front portion and a rear portion in the longitudinal direction. The cam hole 31 of the eject lever 23 consists of a horizontal cam portion 31a extending horizontally in a front to back direction, and a tilting cam portion 31b extending obliquely downward continually from a rear end portion of the horizontal cam portion 31a. A guide shaft 33 is slidably engaged with the cam hole 31.

The guide shaft 33 is provided on one side face plate 22b of the cartridge holder 22, projecting outwardly in a lateral direction, penetrating through a relief hole 34 provided in one side face plate 21b of the chassis 21 and projecting to an outside of the relief hole 34 and inserted into the cam hole 31. When the guide shaft 33 stays at a low end portion of the tilting cam portion 31b, the cartridge holder 22 becomes a horizontal state and when the guide shaft 33 climbs the tilting cam portion 31b, the cartridge holder 22 becomes a tilting state with its front side being lifted up. When the guide shaft 33 moves to the horizontal cam portion 31a, the cartridge holder 22 is locked in the tilting state.

At a front portion and a rear portion of one side face plate 21b of the chassis 21 are respectively provided guide pins 35, 35 projecting outwardly in a lateral direction. The guide pins 35, 35 are slidably engaged with guide holes 32, 32 of the eject lever 23, respectively. The guide holes 32, 32 are provided by being linearly extended in a forward and backward direction of the eject lever 23, and the eject lever 23 is prevented from coming off by flange-like head portions provided at tips of the respective guide pins 35, 35.

Between the eject lever 23 and the chassis 21 is stretched a tension coil spring 36 as an urging means. A rear end of the coil spring 36 is engagingly stopped by an engagingly-stop tab 23a provided on a rear end portion of the eject lever 23, and a front end of the coil spring 36 is engagingly stopped by an engagingly-stop tab 21d provided on the chassis 21. By the spring force of the coil spring, the eject lever 23 is always urged toward the front side. An eject input portion 23b at a tip end portion of the eject lever 23 is projected forward from the front panel 8. The eject button 14 shown in FIG. 2 is attached to the eject input portion 23b and an ejecting operation of the disk cartridge 50 is carried out when the eject button 14 is pressed.

Figure 6:
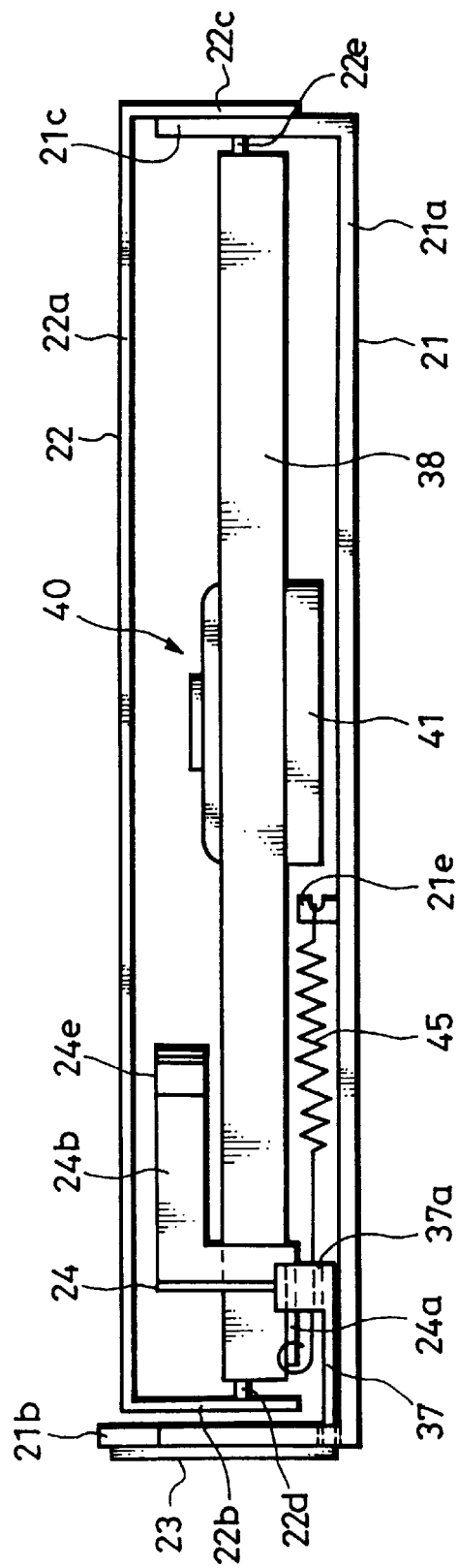
FIG. 6 is a rear view of the disk loading mechanism shown in FIG. 4.
Figure 7:
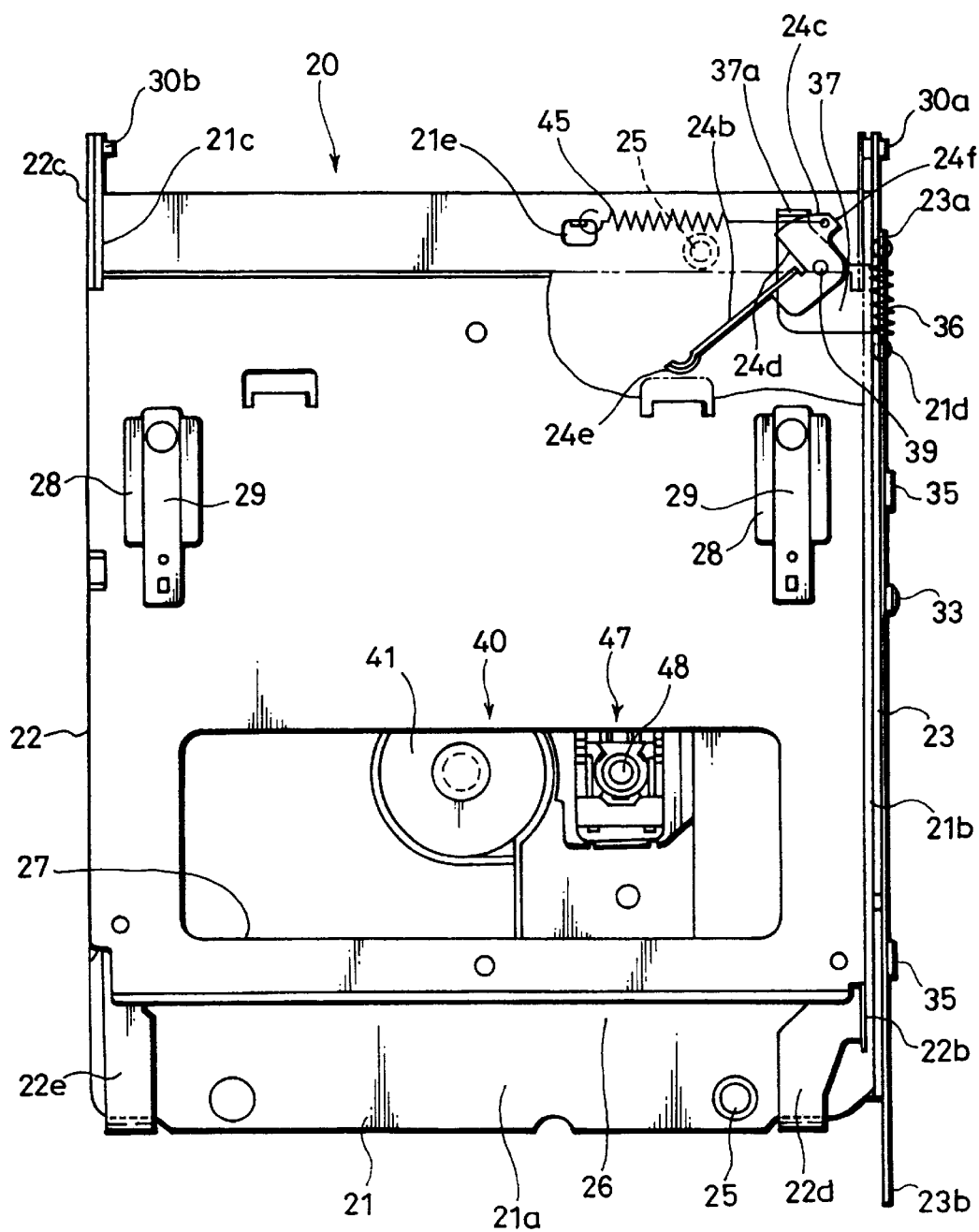
FIG. 7 is a plan view of the disk loading mechanism shown in FIG. 4.

Further, at the rear portion of the eject lever 23 is integrally provided a L-letter shaped engagement stopper portion 37, as shown in FIG. 6, with its low end portion folded toward the inside. As, shown in FIG. 7, at a tip end portion of the engagement stopper portion 37, which protrudes backward, is formed a stopper tab 37a made to stand upward. The holder block member 24 which is rotatably and pivotally supported by the chassis 21 is slidably engaged with the stopper tab 37a of the engagement stopper portion 37.

The holder lock member 24 is attached to a plate member 38 constituting a part of the chassis 21, so as to be freely rotatable. The plate member 38 consists of a plate-like member large enough to be accommodated within the chassis 21 and is integrally fixed to the chassis 21 by a fixing means such as a fixing screw and the like. The holder lock member 24 is rotatably supported by a fulcrum shaft 39 provided in the plate member 38.

The holder lock member 24 comprises a rotating plate 24a formed in a plane L-letter shape, a rotating arm 24b being provided on one side of the rotating plate 24a and having appropriate elasticity, and an engagement edge portion 24c provided on the other side of the rotating plate 24a. The engagement edge portion 24c is formed in an arc shape with the center of the fulcrum shaft 39 as the center of curvature. When an engagement edge portion 24c of the holder lock member 24 is rotated, the engagement edge portion 24c and the stopper tab 37a are slidably engaged with each other and the engagement is released at a predetermined position. When the engagement is released, the eject lever 23 is moved by a spring force of the coil spring 36 toward the front end side, and then the lock portion 24d of the holder lock member 24 and the stopper tab 37a are engaged with each other, thereby rotation of the holder lock member being prevented.

The rotation arm of the holder lock member 24 stands up on the rear side of and projects above the plate member 38. A tip end portion of the rotation arm 24b is formed so as to be bent inward and is so arranged to be capable of entering between an upper surface of the plate member 38 and the upper plate 22a of the cartridge holder 22, i.e., within a disk cartridge loading portion. At a tip end portion of the engagement end portion of the holder lock member 24 is provided a spring receiving hole 24f and one end of a coil spring 45 as an urging means is engaged with the spring receiving hole 24f.

The other end of the coil spring 45 is engaged with a spring receiving tab 21e provided on the chassis 21. By an urging force of the coil spring 45, an input portion 24e at a tip end portion of the rotation arm 24b is urged toward the disk cartridge loading portion side. The input portion 24e of the rotation arm 24b is formed in an arc shape to become convex toward the front side. The input portion 24e permits the rotary arm 24b to smoothly slide while being in touch with the disk cartridge 50 at any position of the swinging.

The power converting means is arranged by the above mentioned guide pins 35, 35 of the chassis 21, the guide shaft 33 of the cartridge holder 22, the cam hole 31, the guide holes 32, 32 and the engagement stopper portion 37 of the eject lever 23, the holder lock member 24 and the coil springs 36 and 45.

At the middle portion on a front side of the plate member 38, the spindle motor 41 of the disk rotation driving mechanism 40 is held facing upward and fixed. The spindle motor 41 is integrally provided with a turn table capable of magnetically chucking a disk-like storage medium 53 of the disk cartridge 50. The spindle motor 41 has a fixed member fixed on the plate member 38 and a rotation member rotatably supported by the fixed member. The rotating member is provided integrally with the turntable. At the center of the turntable is buried an annular magnet, by which the storage medium is chucked on the turntable.

On one side of the spindle motor 41 is provided an optical pick-up apparatus 48 of an information reproduction mechanism 47 capable of moving toward a radius direction of the disk-like storage medium 53. The optical pick-up apparatus 48 is held on the plate member 38 so as to be capable of moving forward and backward and moves toward the radius direction of the disk-like storage medium 53, thereby an information signal stored in its information storage area of the disk-like storage medium 53 being read out therefrom and then reproduced.

An operation of the disk reproducing apparatus 6 will be explained. As shown in FIG. 2, an operation of inserting the disk cartridge 50 into a boundary part between the front panel 8 and the lid body 9 of the disk reproducing apparatus 6 will be described. The disk cartridge 50 is moved toward the lid body 9 with being kept in parallel with the casing 7 and a lower end edge of the insertion side of the disk cartridge 50 is brought in contact with the guide slanting portion 12 of the front panel 8. Not only the lower end edge is brought in contact with the guide slanting portion 12, but also an upper end edge of the insertion side of the disk cartridge 50 may be brought in contact with the guide slanting portion 16 of the lid body 9.

When the disk cartridge 50 is pushed toward the front panel 8 in a state that the insertion-side lower end edge of the disk cartridge 50 is brought in contact with the guide slanting portion 12, the front panel 8 is integrally united with and fixed to the casing 7 and hence the disk cartridge 50 is pushed by a counterforce from the guide slanting portion 12. As a result, the lid body 9 is moved in the release direction by a synthesized force of a pressing force resulting from the counterforce against the disk cartridge 50 and an insertion pressing force toward the front panel 8, thereby the storage medium insertion portion 11 being opened.

Figure 8A:
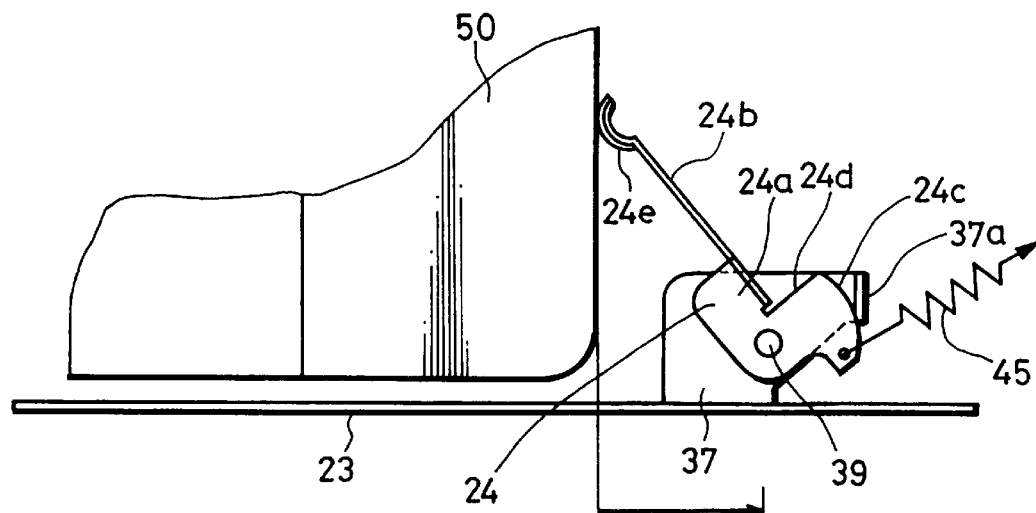

Then, by pushing the disk cartridge 50 further into the storage medium insertion portion 111, the disk cartridge 50 is inserted into the disk cartridge loading portion from the cartridge inserting mouth 26 of the cartridge holder 22. Then, when the disk cartridge 50 is inserted up to a predetermined position within the disk cartridge inserting portion of the cartridge holder 22, as shown in FIG. 8A, a tip end portion on the inserting side of the disk cartridge 50 comes in touch with the input portion 24e of the holder lock member 24. When the disk cartridge 50 is pushed in further against the urging force of the coil spring 45, the holder lock member 24 is rotated in a clockwise direction with the fulcrum shaft 39 as a center of a rotation.

Figure 8B:
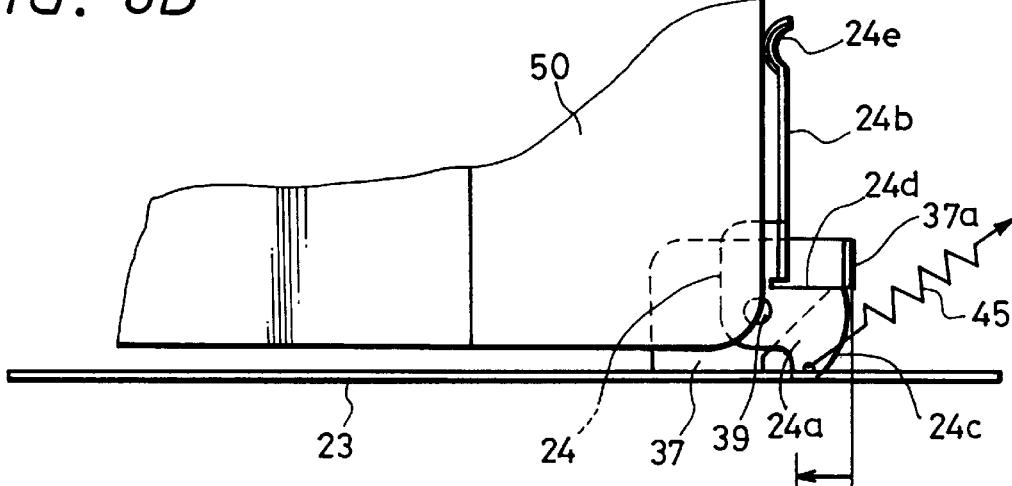

Then, the engagement end portion 24c of the holder lock member 24 is rotated while in contact with an inner surface of the stopper tab 37a provided on the engagement stopper portion 37 of the eject lever 23. However, because the engagement end portion 24c is formed in an arc shape with the fulcrum shaft 39 as a center, while the disk cartridge 50 is approaching the holder lock member 24, the eject lever 23 is kept in its initial position. As shown in FIG. 8B, when the disk cartridge 50 is inserted into a predetermined position of the loading portion and the lock portion 24d of the holder lock member 24 coincide with an end edge of the stopper tab 37a, a lock of the holder lock member 24 is released.

Figure 8C:
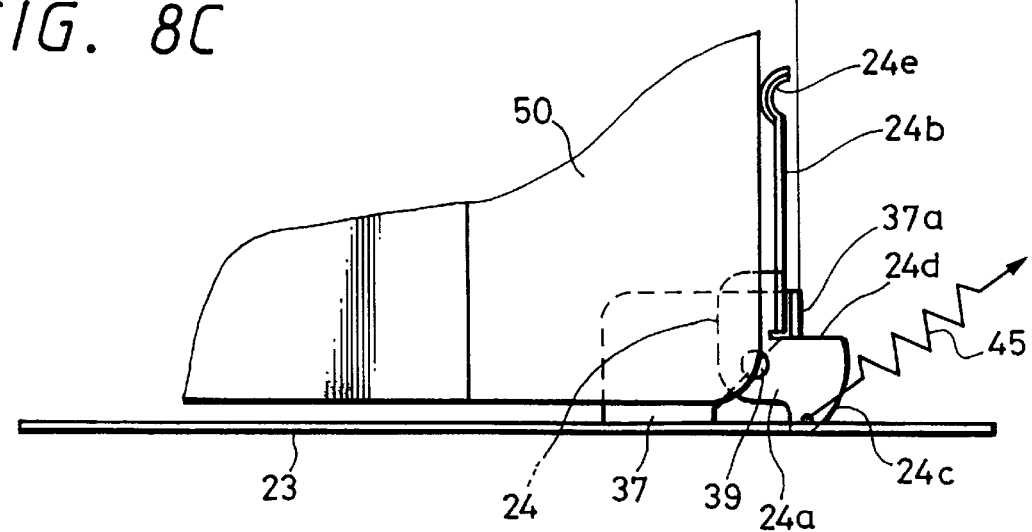

Since the locked state of the holder lock member 24 is released and consequently the eject lever 23 is constantly urged toward the inserting mouth side by the coil spring 36 stretched between it and the chassis 21, the eject lever 23 moves forward and changes into a state as shown in FIG. 8C. Since the eject lever 23 is made to be capable of moving linearly in the forward to backward direction by the guide pins 35, 35 engaged with its guide holes 32, 32, it is linearly moved forward by a spring force of the coil spring 36. The holder lock member 24 which has, by movement of the eject lever 23, served as a stopper against the engagement stopper portion 37 and prevented the eject lever 23 from moving forward, is prevented from rotating by the stopper 37a of the engagement stopper portion 37, and the disk cartridge 50 is locked in a state of being loaded.

Figure 9:
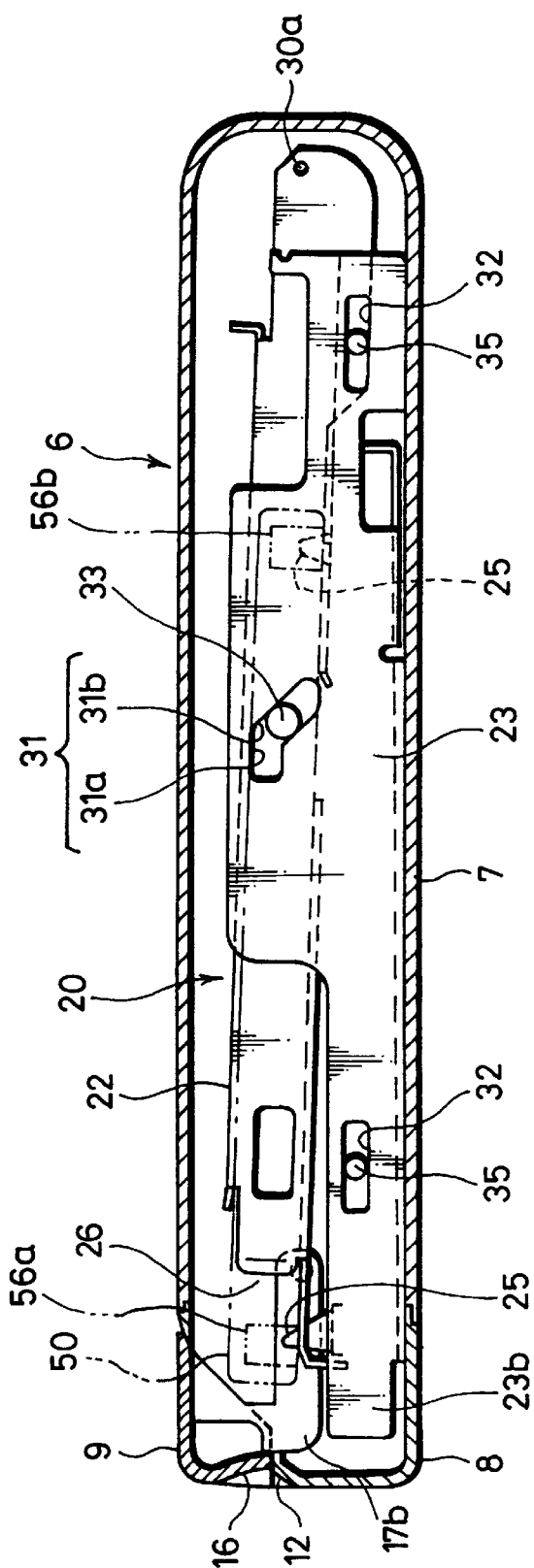
FIG. 9 is a diagram used to explain a rotation operation of the disk loading mechanism shown in FIG. 4 in a state that the inclined angle of the cartridge holder is set smaller from the state shown in FIG. 4.

When the eject lever 23 moves forward, the guide shaft 33 of the cartridge holder 31 comes out of the horizontal cam portion 31a by being guided by the cam hole 31 and enters into the slanting cam portion 31b. The guide shaft 33 is positioned in the horizontal cam portion 31a and then the cartridge holder 31 which initially is lifted at its front portion and brought in its inclined state. When the guide shaft 33 is moved in the slant cam portion 31b, as shown in FIG. 9, the front side of the cartridge holder 33 is gradually lowered.

Figure 10:
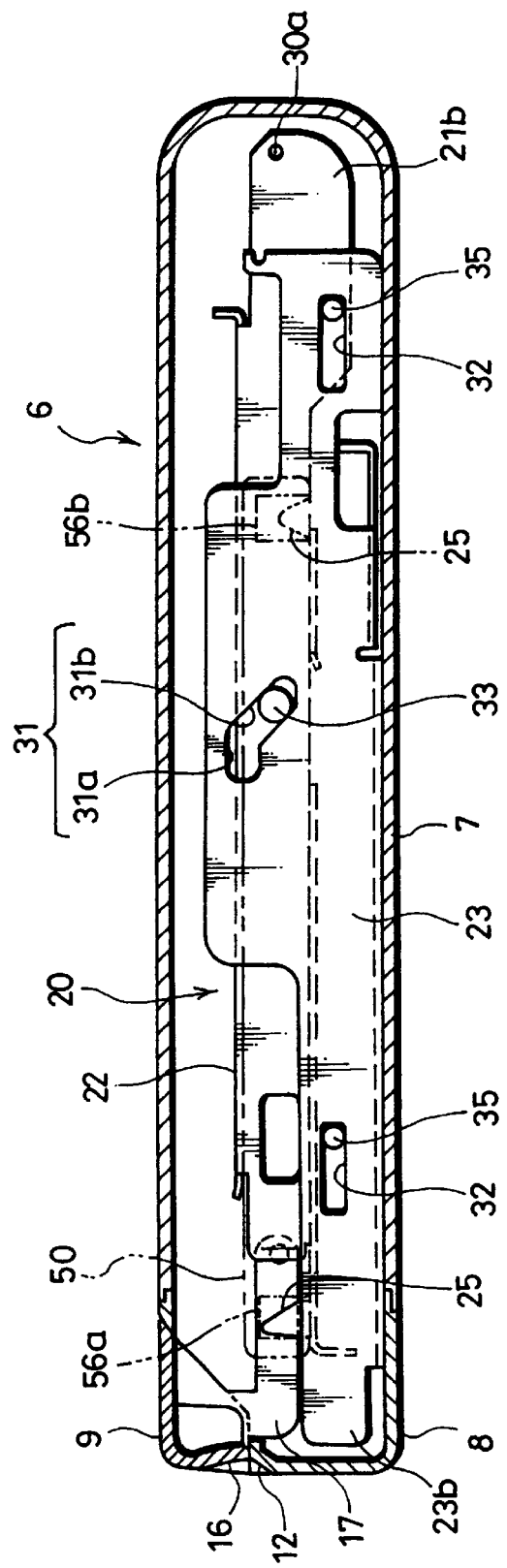
FIG. 10 is a diagram used to explain a rotation operation of the disk loading mechanism shown in FIG. 4 in a state that the cartridge holder is brought into its horizontal state from the state shown in FIG. 9.

When the eject lever 23 is moved to a predetermined front side position, as shown in FIG. 10, the guide shaft 33 moves to a low end portion of the slanting cam portion 31b and the cartridge holder 31 becomes a state of being horizontal.

When the cartridge holder 31 is kept in its horizontal state, a pair of the guide pins 25, 25 are fitted in the set of positioning holes 56a and 56b of the disk cartridge 50, and the disk cartridge 50 is positioned.

When the disk-like storage medium 53 housed in the disk cartridge 50 held by the cartridge holder 22 is mounted on the turntable provided in the spindle motor 41 of the mechanism 40, and the disk-like storage medium 53 is chucked by absorbing the metal hub 53a fitted to the lower surface of the disk-like storage medium 53 by the magnet buried in the turntable. Since the reproduction head is inserted into the opening portion 54 of the disk cartridge 50 in which the shutter 55 is opened, the disk-like storage medium 53 is reproduced.

An operation of ejecting the disk cartridge 50 is carried out by an operation converse to the time of insertion mentioned above. The operation of ejecting the disk cartridge 50 is started by operation of the eject button 14 shown in FIG. 2. When the eject button 14 is pressed and the eject lever 23 is activated to retreat, the guide shaft 33 moves up along the slanting cam portion 31b while being guided by the cam hole 31. Then, since the guide shaft 33 is moved to the cam portion 31b, consequently the front side of the cartridge holder 22 is raised and the cartridge inserting mouth 26 is positioned at an inside of the storage medium insertion portion 11. When the eject lever 23 is moved backward, the stopper tab 37a of the engagement stopper portion 37 is moved backward as shown in FIG. 8C with being guided by the lock portion 24d of the holder lock member 24.

When the end edge of the stopper 37a is positioned at the engagement edge portion 24c after passing the lock portion 24d, the locked state by the stopper 37a is released and the holder lock member 24 is rotated counter-clockwise by the spring force of the coil spring 45 as shown in FIG. 8B. The disk cartridge 50 is pushed out by rotation of the rotating arm 24b of the hold lock member 24 and brought into the state of FIG. 8A from the state of FIG. 8B.

When the disk cartridge 50 is pushed out in this manner, the lid body 9 is forced open from the inside by its pushing force (refer to FIG. 6). As a result, the grip side of the disk cartridge 50 is protruded out by a predetermined length and by gripping and pulling out the protruded portion, the disk cartridge 50 can be easily taken out from the disk reproducing apparatus 6.

The cartridge holder 22 is rotatably supported by the chassis 21 and thus the rotation-type loading mechanism with a rotation fulcrum is formed. Hence, the cartridge holder 22 can be surely rotated even though by a lever operation from a unilateral side when the cartridge holder 22 has enough stiffness. Of the conventional mechanism which is operated by levers of both sides, a guide mechanism of one side can be omitted and hence it is possible to achieve simplification of the mechanism itself and miniaturization of the loading mechanism to an extent of the guide mechanism.

Since a method of loading the above disk cartridge 50 onto the cartridge holder 31 is only to insert the disk cartridge by the pushing force of a user, the lock of the engagement stopper portion of the eject lever 23 is not released from locking until the disk cartridge 50 is completely inserted into a predetermined position. Specifically, it is necessary for the user to push the disk cartridge 50 to a deeper portion, which provides unsatisfactory operability upon insertion of the disk cartridge 50.

In order to improve the above unsatisfactory operability, the relief surface 60 is provided in the lock portion 24d of the holder lock member 24.

Figure 11A:
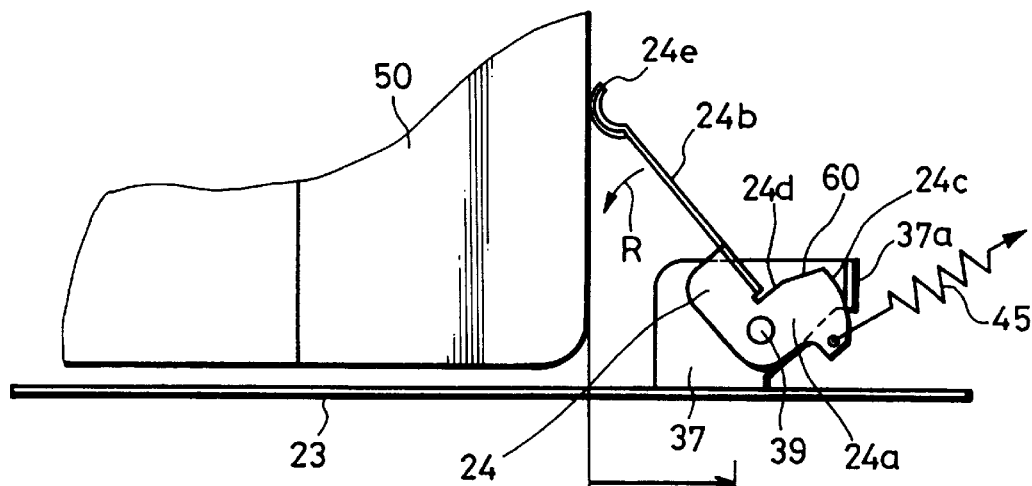
Figure 11B:
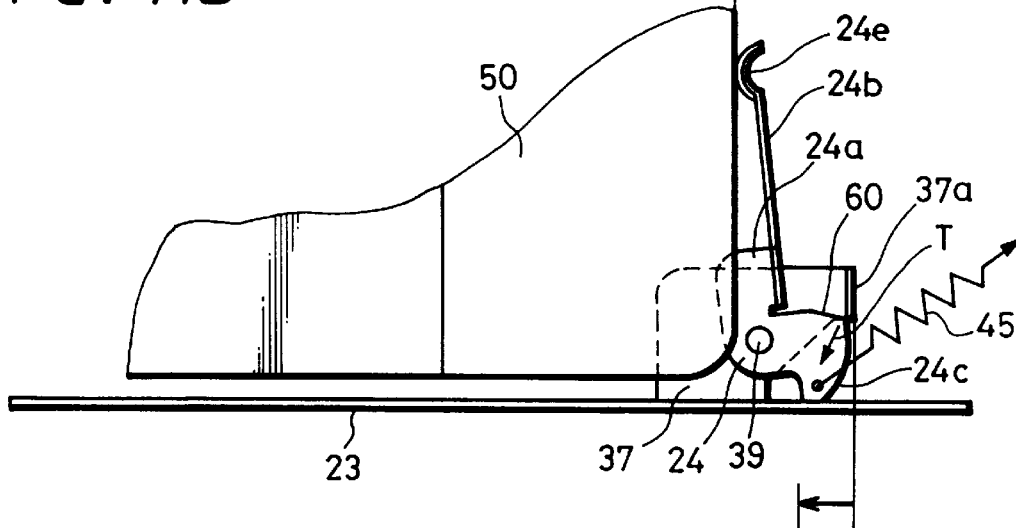
Figure 11C:
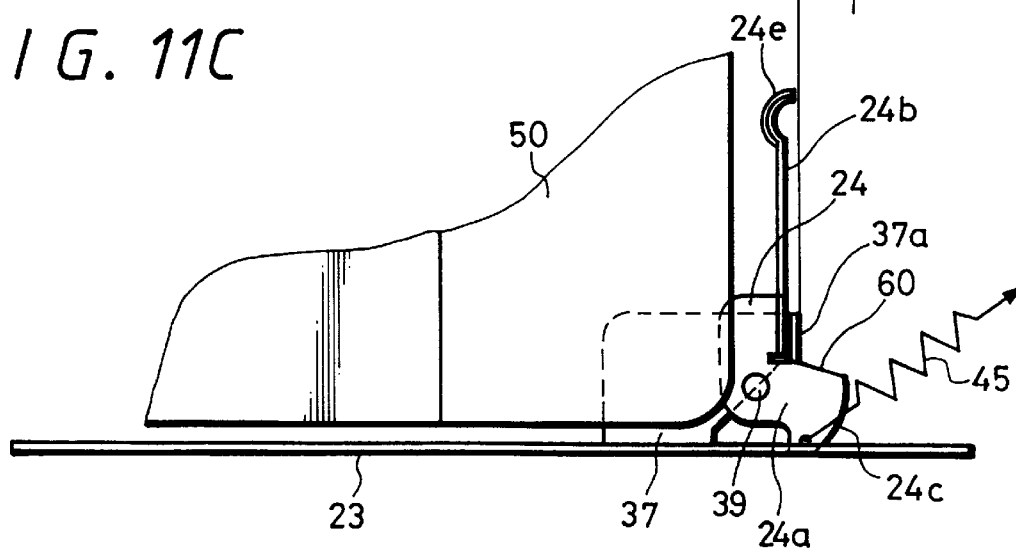

The relief surface 60 of the holder lock member 24 is formed, as shown in FIGS. 11A through 11C, by cutting off a tip end portion of the lock portion 24d of the rotation plate 24a in a triangle shape. The relief surface 60 can make the timing of lock releasing by the holder lock member 24 faster as compared with the case shown in FIG. 8.

Since the above holder lock member is employed, the timing of the lock releasing of the holder lock member 24 is improved. Specifically, when the disk cartridge 50 is inserted near a predetermined position of the disk cartridge loading portion after being inserted into the disk cartridge loading portion from the cartridge inserting mouth 26 of the cartridge holer 22, as shown in FIG. 11A, a tip end portion on the inserting side of the disk cartridge 50 is brought in contact with the input portion 24e of the holder lock member 24.

When the disk cartridge 50 is pushed against the urging force of the coil spring 45, as shown in FIG. 11A, the holder lock member 24 is rotated in a clockwise direction with the fulcrum shaft 39 as a center of rotating. The engagement edge portion 24c of the holder lock member 24 is rotated while touching the inner plane of the stopper tab 37a provided on the engagement stopper portion 37 of the eject lever 23. However, since the engagement edge portion 24c is formed in an arc shape with the fulcrum shaft 39 as a center, the disk cartridge 50 approaches the holder lock member 24, while the eject lever 23 is held in an initial position.

Then, as shown in FIG. 11B, when the disk cartridge 50 is inserted near a predetermined position of the loading portion and the escape face 60 of the holder lock member 24 is agreed with an end edge of the stopper tab 37a, the locking of the holder lock member 24 is released. Specifically, the timing of the lock releasing of the holder lock member 24 is made faster, by the extent of the relief surface 60. The eject lever 23 is moved a little forward by the urging force of the coil spring 36 strung between it and the chassis 21, and by the moving force, a rotational force T heading for the clockwise direction in FIG. 11B is applied to the holder lock member by the stopper tab. By the rotational force T, a force of the holder lock member 24 for pushing back the disk cartridge 50 is canceled.

Since the holder lock member having the relief surface 60 applies the rotational force T for canceling a pressing force by the user and a force for pressing the disk cartridge back by the holder lock member 24 to the disk cartridge inserted into the cartridge holder 22, the operation of releasing the locking of the holder lock member is carried out at an earlier timing, which improves the operability upon the insertion of the disk cartridge 50.

Figure 12:
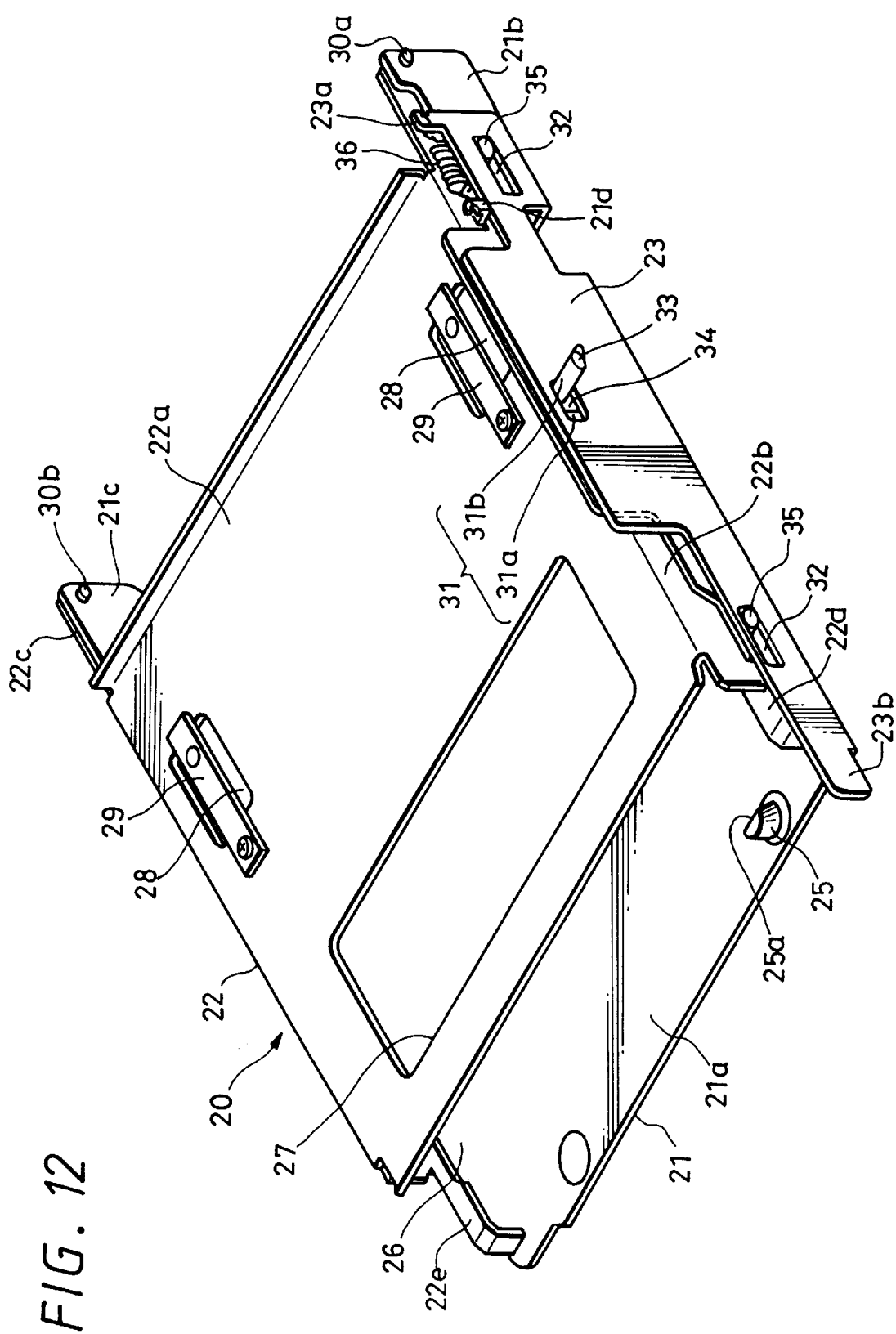
FIG. 12 is a perspective view showing an appearance of a rotary disk loading mechanism with the guide pin shown in FIG. 4 having an inclined portion.

For further improvement of the operability, as shown in FIG. 12, an inclined surface 25a is provided in the guide pin 25 to provide a drawing mechanism of the guide pin 25. The inclined plane 25a of the guide pin 25 is formed as a plane descending backward on a rear side of the guide pin 25. As a shape of the inclined plane 25a, a plane is suitable and the inclination angle of the inclined plane 25a differs depending on a moving distance of the disk cartridge 50, a coefficient of friction of a material used and the like, and is appropriately set. The inclined plane 25a is brought in contact with the disk cartridge 50 and hence can position the disk cartridge 50 on the chassis 21, which is inserted into the cartridge holder 22, by drawing and dropping it thereon. Meanwhile, the positioning hole 56a to which the guide pin 25 is fitted is one of reference portions provided in the disk cartridge 50.

Figure 13:
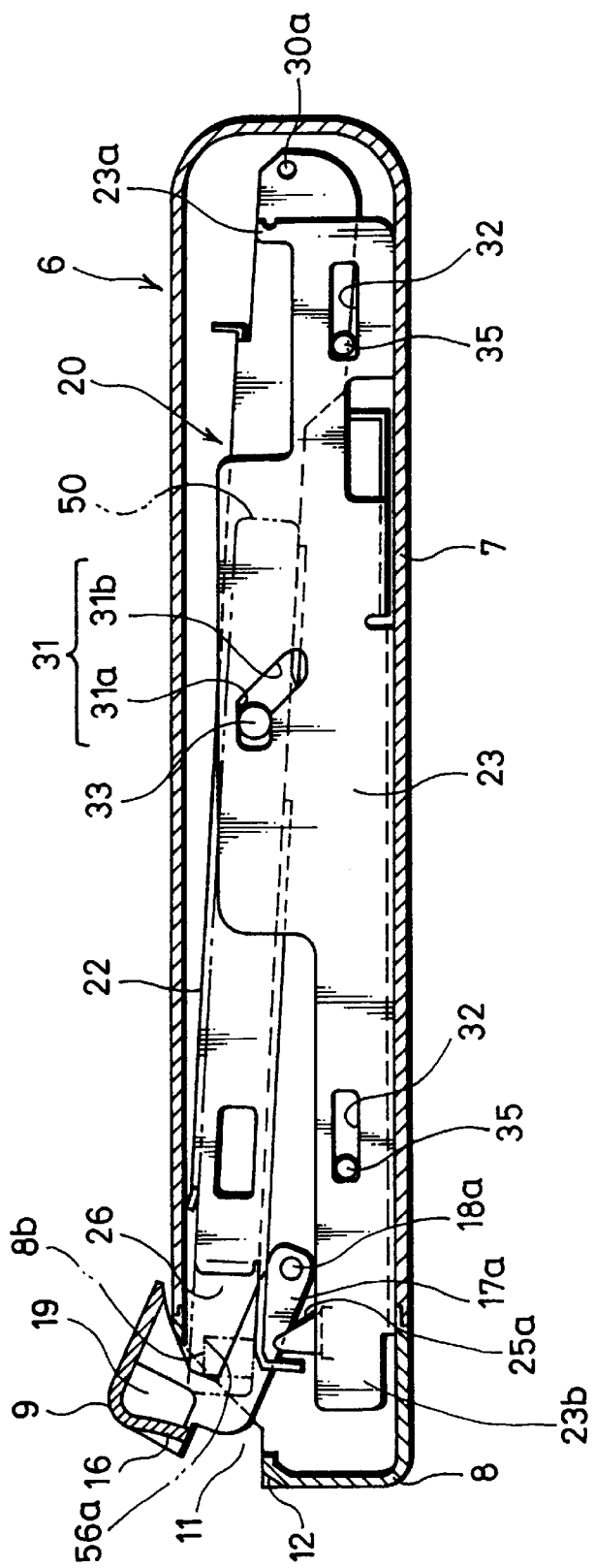
FIG. 13 is a diagram used to explain a rotation operation of the disk loading mechanism shown in FIG. 12 in a state that the inclined angle of the cartridge holder is set maximum.
Figure 14:
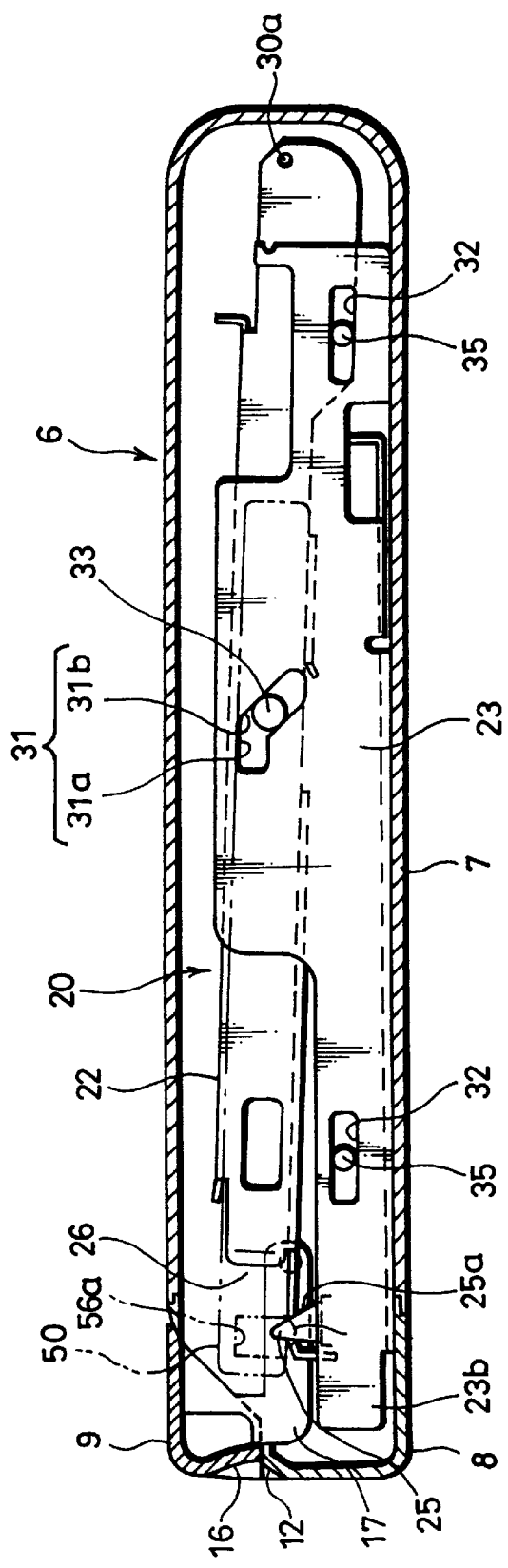
FIG. 14 is a diagram used to explain a rotation operation of the disk loading mechanism shown in FIG. 12 in a state that the inclined angle of the cartridge holder is set smaller from the state shown in FIG. 13.
Figure 15:
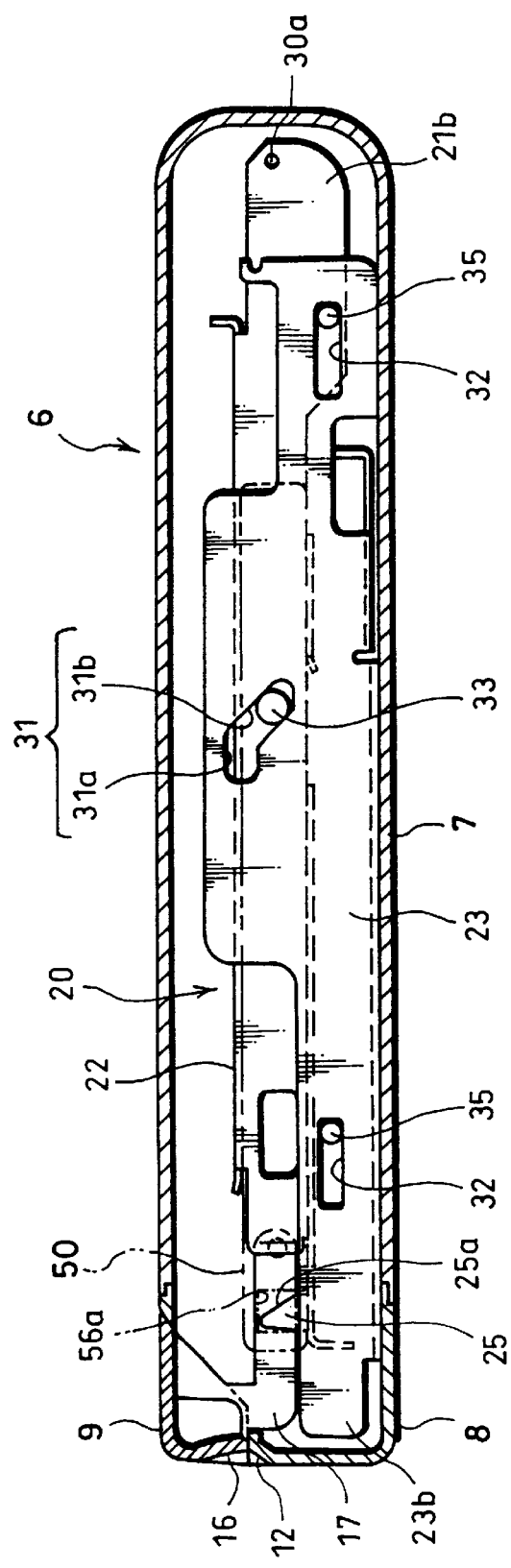
FIG. 15 is a diagram used to explain a rotation operation of the disk loading mechanism shown in FIG. 12 in a state that the cartridge holder is brought into its horizontal state from the state shown in FIG. 14;.

However, if the holder lock member 24 has the relief surface 25a, although, if only the inclined surface 25a is provided, the disk cartridge 50 is prevented from being completely loaded onto the cartridge holder 22 by canceling a force for pushing the positioning aperture 56a by the guide pin 25 and a force for pressing the disk cartridge 50 by the rotary arm 24b each other, the disk cartridge 50 is drawn into the cartridge holder 22. The stopper tab 37a of the engagement stopper portion 37 is engaged with the lock portion 24d of the holder lock member 24, the eject lever 23 and the holder lock member 24 change into states shown in FIG. 11C. The holder lock member 24 is prevented from rotating by the stopper tab 37a and the disk cartridge 50 is locked in a state of being loaded onto the cartridge holder 22. Successive states when the disk cartridge 50 is drawn into the cartridge holder 22 are shown in FIGS. 13, 14 and 15.

The disk reproducing apparatus according to the present invention has a simple arrangement which present a width thereof smaller to an extent of a one-side lever mechanism. Moreover, the operation of the drawing the disk cartridge 50 is successively carried out by the relief surface 60 of the holder lock member 24 and the inclined surface 25a of the guide pin 25 as shown in FIGS. 13, 14 and 15. The operation of ejecting the disk cartridge 50 is carried out by an operation reverse to the operation carried out upon the insertion thereof.

As set forth above, the present invention is not limited to the above mentioned embodiment. For example, in the above mentioned embodiment, an explanation has been made on an example using a magneto-optical disk as a storage medium, but disk-like storage media such as an optical disk, a magnetic disk and the like can be used as a storage medium and a magnetic tape and the other storage media such as a card-shaped medium having a semiconductor memory sealed therein can be applied. Further, in the above embodiment, an explanation has been made on an example in which the embodiment is applied to a disk reproducing apparatus used solely for storage, but the embodiment is applied not only to a memory apparatus which has an object only for recording, but also to a memory apparatus which has a combined use for storage and reproduction.

Also, in the above mentioned embodiment, an explanation has been made on an example in which the positioning hole 56a is used as the reference portion for drawing the disk cartridge 50 by the guide pin 25, but it is possible to use an corner portion of the lower shell as the reference portion, and other than that, an arrangement is also possible in which in stead of the guide pin 25, a convex portion or a concave portion is appropriately provided and a concave portion or a convex portion capable of engaging with the convex portion or the concave portion is provided on the disk cartridge 50. Further, in the above mentioned embodiment, an explanation has been made on an example in which the guide pin 35 is provided on the chassis 25, the guide shaft 33 is provided on the cartridge holder 22, and the cam hole 31 and the cam hole 32 are provided in the eject lever 23, but an arrangement is also possible, for example, in which a guide hole is provided in the chassis 21, a cam hole is provided in the cartridge holder 22 and a guide shaft and a guide pin are provided on the eject lever 23. While in the embodiment the relief surface 60 is provided in the holder lock member 24 is provided, the relief surface may be provided in an engagement stopper portion or on both of the holder lock member and the engagement stopper portion.

Further, an explanation has been made on an example in which the coil springs 36 and 45 are used as the urging member, but not only a twisted spring, a flat spring and the other spring members but also a spring member like a rubber state elastic body can be used. As such, the present invention can be variously altered within a range of not departing from its gist.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A storage medium loading mechanism, comprising:
   holder which is rotatably supported by a chassis and into which a storage medium is inserted;
   an operation member disposed on one side of said holder and movably supported by said chassis;
   a holder locking member rotatably provided on said chassis and biased by a first springy member; and
   an engagement portion provided on said operation member and biased by a second springy member in a predetermined direction to thereby be engaged with said holder locking member, wherein when said holder locking member is brought in contact with said storage medium to be inserted into said holder and thereby rotated against a spring force of said first springy member, a relief surface provided on one of said holder locking member and said engagement portion is brought in contact with the other one of said holder locking member and said engagement portion and release of engagement of said holder locking member and said engagement portion is started.

2. The storage medium loading mechanism according to claim 1, further comprising:
   an operation converting means for converting movement of said operation member into rotation of said holder.

3. The storage medium loading mechanism according to claim 2, wherein said operation converting means has a cam aperture provided on one of said holder and said operation member and a guide shaft provided on the other thereof and slidably engaged with said cam aperture and wherein said cam aperture has a horizontal cam portion extended in a forward and backward direction and an inclined cam portion extended continuously from one side of said horizontal cam portion in a diagonal direction.

4. The storage medium loading mechanism according to claim 2, wherein when release of engagement of said holder locking member and said engagement portion is started, said operation member is moved integrally with said engagement portion to thereby rotate said holder, and said engagement portion restricts rotation of said holder locking member.

5. The storage medium loading mechanism according to claim 4, wherein when said operation member is moved to its original position, said holder is rotated to a predetermined angle position relative to said chassis and then said storage medium held by said holder is protruded out of the holder.

6. The storage medium loading mechanism according to claim 4, wherein when said operation member is moved to its original position, restriction of rotation of said holder locking member by said engagement portion is released to thereby rotate said holder locking member by a spring force of said first springy member and one end of said holder locking member is brought in contact with and pressed by said storage medium held by said holder, thereby said storage medium being ejected from said holder to the outside.

7. The storage medium loading mechanism according to claim 2, further comprising:
   a guide means which is provided on said chassis and which, when said holder is rotated by movement of said operation member through an operation of said operation converting means, is brought in contact with a reference portion of said storage medium held by said holder and presses said storage medium in the insertion direction.

8. The storage medium loading mechanism according to claim 7, wherein on a portion of said guide means with which a reference portion of said storage medium is brought in contact, an inclined portion for applying a counterforce in the direction of insertion of said storage medium to said storage medium by being pressed by said reference portion is provided.

9. The storage medium loading mechanism according to claim 7, wherein said operation converting means has a cam aperture provided on one of said holder and said operation member and a guide shaft provided on the other thereof and slidably engaged with said cam aperture and said cam aperture has a horizontal cam portion extended in a forward and backward direction and an inclined cam portion extended continuously from one side of said horizontal cam portion in a diagonal direction.

10. The storage medium loading mechanism according to claim 7, wherein when release of engagement of said holder locking member and said engagement portion is started, said operation member is moved integrally with said engagement portion to thereby rotate said holder, and said engagement portion restricts rotation of said holder locking member.

11. The storage medium loading mechanism according to claim 10, wherein when said operation member is moved to its original position, said holder is rotated to a predetermined angle position relative to said chassis and then said storage medium held by said holder is protruded out of the holder.

12. The storage medium loading mechanism according to claim 10, wherein when said moved operation member is moved to its original position, restriction of rotation of said holder locking member by said engagement portion is released to thereby rotate said holder locking member by a spring force of said first springy member and one end of said holder locking member is brought in contact with and pressed by said storage medium held by said holder, thereby said storage medium being ejected from said holder to the outside.

13. The storage medium loading mechanism according to claim 7, wherein when said storage medium is inserted into said holder, said holder locking member is brought in contact with said storage medium and thereby rotated against a biasing force of said springy member, and an inclined portion is provided as a relief surface provided on a side of an end of rotation of said holder locking member.

14. The storage medium loading mechanism according to claim 1, wherein when said storage medium is inserted into said holder, said holder locking member is brought in contact with said storage medium and thereby rotated against a biasing force of said first springy member, and an inclined portion is provided as the relief surface on a side of said holder locking member at an end of rotation of said holder locking member.

15. A storage medium storage and/or reproducing apparatus comprising:
   a holder which is rotatably supported by a chassis and into which a storage medium is inserted;
   an operation member disposed on one side of said holder and movably supported by said chassis;

a holder locking member rotatably provided on said chassis and biased by a first springy member;

a storage and/or reproducing means for storing and/or reproducing said storage medium held by said holder; and an engagement portion provided on said operation member and biased by a second springy member in a predetermined direction to thereby be engaged with said holder locking member, wherein when said holder locking member is brought in contact with said storage medium to be inserted into said holder and thereby rotated against a spring force of said first springy member, a relief surface provided on one of said holder locking member and said engagement portion is brought in contact with the other one of said holder locking member and said engagement portion and release of engagement of said holder locking member and said engagement portion is started.

16. The storage medium storage and/or reproducing apparatus according to claim 15, further comprising:

an operation converting means for converting movement of said operation member into rotation of said holder.

17. The storage medium storage and/or reproducing apparatus according to claim 16, wherein said operation converting means has a cam aperture provided on one of said holder and said operation member and a guide shaft provided on the other thereof and slidably engaged with said cam aperture and said cam aperture has a horizontal cam portion extended in a forward and backward direction and an inclined cam portion extended continuously from one side of said horizontal cam portion in a diagonal direction.

18. The storage medium storage and/or reproducing apparatus according to claim 16, wherein when release of engagement of said holder locking member and said engagement portion is started, said operation member is moved integrally with said engagement portion to thereby rotate said holder, and said engagement portion restricts rotation of said holder locking member.

19. The storage medium storage and/or reproducing apparatus according to claim 18, wherein when said operation member is moved to its original position, said holder is rotated to a predetermined angle position relative to said chassis and then said storage medium held by said holder is protruded out of the holder.

20. The storage medium storage and/or reproducing apparatus according to claim 18, wherein when said operation member is moved to its original position, restriction of rotation of said holder locking member by said engagement portion is released to thereby rotate said holder locking member by a spring force of said first springy member and one end of said holder locking member is brought in contact with and pressed by said storage medium held by said holder, thereby said storage medium being ejected from said holder to the outside.

21. The storage medium storage and/or reproducing apparatus according to claim 16, further comprising:

a guide means which is provided on said chassis and which, when said holder is rotated by movement of said operation member through an operation of said operation converting means, is brought in contact with a reference portion of said storage medium held by said holder and presses said storage medium in the insertion direction.

22. The storage medium storage and/or reproducing apparatus according to claim 21, wherein on a portion of said guide means with which a reference portion of said storage medium is brought in contact, an inclined portion for applying a counterforce in the direction of insertion of said storage medium to said storage medium by being pressed by said reference portion is provided.

23. The storage medium storage and/or reproducing apparatus according to claim 21, wherein said operation converting means has a cam aperture provided on one of said holder and said operation member and a guide shaft provided on the other thereof and slidably engaged with said cam aperture and said cam aperture has a horizontal cam portion extended in a forward and backward direction and an inclined cam portion extended continuously from one side of said horizontal cam portion in a diagonal direction.

24. The storage medium storage and/or reproducing apparatus according to claim 21, wherein when said storage medium is inserted into said holder, said holder locking member is brought in contact with said storage medium and thereby rotated against a biasing force of said springy member, and an inclined portion is provided as a relief surface provided on a side of an end of rotation of said holder locking member.

25. The storage medium storage and/or reproducing apparatus according to claim 21, wherein when release of engagement of said holder locking member and said engagement portion is started, said operation member is moved integrally with said engagement portion to thereby rotate said holder, and said engagement portion restricts rotation of said holder locking member.

26. The storage medium storage and/or reproducing apparatus according to claim 25, wherein when said operation member is moved to its original position, said holder is rotated to a predetermined angle position relative to said chassis and then said storage medium held by said holder is protruded out of the holder.

27. A storage medium storage and/or reproducing apparatus according to claim 25, wherein when said moved operation member is moved to its original position, restriction of rotation of said holder locking member by said engagement portion is released to thereby rotate said holder locking member by a spring force of said first springy member and one end of said holder locking member is brought in contact with and pressed by said storage medium held by said holder, thereby said storage medium being ejected from said holder to the outside.

28. The storage medium storage and/or reproducing apparatus according to claim 15, wherein when said storage medium is inserted into said holder, said holder locking member is brought in contact with said storage medium and thereby rotated against a biasing force of said springy member, and an inclined portion is provided as a relief surface provided on a side of an end of rotation of said holder locking member.

* * * * *